United States Patent [19]

Blemberg et al.

[11] Patent Number: 5,061,534
[45] Date of Patent: Oct. 29, 1991

[54] HIGH OXYGEN BARRIER FILM

[75] Inventors: Robert J. Blemberg, Appleteon; Dennis Kester, Neenah, both of Wis.

[73] Assignee: American National Can Company, Chicago, Ill.

[21] Appl. No.: 184,997

[22] Filed: Apr. 22, 1988

[51] Int. Cl.⁵ ............ B29D 22/00; B32B 27/08; B65D 85/72
[52] U.S. Cl. ............ 428/36.7; 428/35.4; 428/349; 428/516; 428/518; 264/176.1; 206/484; 53/484
[58] Field of Search ............ 428/36.7, 516, 349, 428/518, 35.4

[56] References Cited

U.S. PATENT DOCUMENTS

| 3,136,657 | 6/1964 | Dixler et al. | 111/138.8 |
| 3,741,253 | 6/1973 | Brax et al. | 138/137 |
| 3,821,182 | 6/1974 | Baird, Jr. et al. | 260/91.7 |
| 3,949,114 | 4/1976 | Viola et al. | 428/337 |
| 3,958,721 | 5/1976 | Kushida et al. | 222/107 |
| 4,044,187 | 8/1977 | Kremkau | 428/212 |
| 4,278,738 | 7/1981 | Brax et al. | 428/515 |
| 4,284,674 | 8/1986 | Sheptak | 428/69 |
| 4,320,175 | 3/1982 | Hisazumi et al. | 428/518 |
| 4,363,840 | 12/1982 | Roullet et al. | 428/35 |
| 4,405,667 | 9/1983 | Christensen et al. | 428/516 |
| 4,457,960 | 7/1984 | Newsome | 428/35 |
| 4,500,677 | 2/1985 | Maruhashi et al. | 525/57 |
| 4,684,573 | 8/1987 | Mueller et al. | 428/349 |
| 4,701,360 | 10/1987 | Gibbons et al. | 428/35 |
| 4,792,488 | 12/1988 | Schirmer | 428/349 |

FOREIGN PATENT DOCUMENTS

| 0219329 | 4/1987 | European Pat. Off. . |
| 2014476 | 8/1979 | United Kingdom . |
| 1591424 | 6/1981 | United Kingdom . |
| 2106471 | 4/1983 | United Kingdom . |
| 2121062 | 12/1983 | United Kingdom . |

Primary Examiner—P. C. Sluby
Attorney, Agent, or Firm—Robert A. Stenzel

[57] ABSTRACT

Packaging films, and packages made with those films which have reduced sensitivity to humidity. The films include a first layer comprising an EVOH copolymer and a second layer comprising a vinylidene chloride copolymer. Packages made with the vinylidene chloride copolymer layer between the low ethylene content EVOH copolymer and the contained product provide high oxygen barrier properties under both high and low humidity conditions. At high humidity conditions, the oxygen barrier properties of the package are provided by the vinylidene chloride copolymer. At lower humidity conditions, the packaging material provides the superior oxygen barrier properties of the EVOH. So the packages of the invention provide superior oxygen barrier properties of the low ethylene content EVOH at lower humidities. But the oxygen barrier properties of the package are never less than those provided by the vinylidene chloride copolymer, even at high humidity conditions.

30 Claims, 8 Drawing Sheets

HIGH OXYGEN BARRIER FILM

BACKGROUND OF THE INVENTION

This invention relates to polymeric films and particularly to those which provide a high oxygen barrier. This invention is especially directed at those films which are exposed to moisture at some point during their expected use life.

It is known that ethylene vinyl alcohol copolymers (EVOH) act as an oxygen barrier in multiple layer films. It is also known that vinylidene chloride copolymers (VDC) provide oxygen barrier properties. However, the oxygen barrier properties of the VDC and EVOH copolymers are affected differently by the humidity of the environment in which the polymers are used. The VDC copolymer provides relatively less oxygen barrier, compared to EVOH's having low ethylene content, and in some cases higher ethylene content, but it is relatively insensitive to changes in humidity. Namely, its oxygen barrier properties are generally about the same at high humidities as they are at low humidities. While there are some variations in the oxygen barrier as the humidity changes, those variations are fairly modest.

Low ethylene content EVOH provides a much better oxygen barrier than VDC at low humidity. Higher ethylene content EVOH provides better oxygen barrier than some VDC copolymers at low humidity. However, the EVOH's are quite sensitive to the humidity to which they are exposed, such that at high humidities, for example over about 75%-80%, the oxygen barrier properties of EVOH are less effective, and are thus less desirable than those of the VDC copolymer. Namely, at humidities over about 75%-80%, the oxygen transmission rates of those EVOH's are typically higher than the oxygen transmission rates of VDC copolymer.

Oxygen transmission rates, as disclosed are discussed herein are based on comparing 1 mil of EVOH against 1 mil of VDC copolymer, except where noted otherwise.

Thus while low ethylene content EVOH is generally preferred for use in low humidity environments, VDC copolymer is typically considered to be better for film which will be exposed to high humidity environments.

Higher ethylene content EVOH's have somewhat higher oxygen transmission rates than either low ethylene content EVOH or some VDC copolymers. The higher ethylene content EVOH has an intermediate moisture sensitivity. Since EVOH is generally easier to process than VDC copolymer, then in some cases, the higher ethylene content EVOH's are preferred in conventional use.

However, it has generally been the practice to use VDC copolymers for films which will be exposed to high humidity environments over some period of their use life, in order to gain at least the barrier properties attendant VDC copolymer, while avoiding the higher oxygen transmission rates of EVOH copolymer in the higher moisture environment. On the other hand, where consistently low humidity is expected on the outside of the package, the lower oxygen transmission rate of low ethylene content EVOH is generally preferred, for achieving extended shelf life.

One disadvantage of this practice has been that a package which is exposed to higher humidity for only a part of its use life has conventionally used a VDC copolymer barrier layer, and thus has not been able to benefit from the lower oxygen transmission rates of low ethylene content EVOH during those periods of its use life when the relative humidity is low enough that the package and its contents could benefit from the use of EVOH copolymer rather than the VDC copolymer. It would therefore be desirable to make a film which provides the high oxygen barrier of EVOH at lower humidities, and wherein its oxygen barrier properties are less sensitive to humidity variations, and are especially less sensitive to high humidity. Indeed it would be desirable to have a film which has the benefits of the lower oxygen transmission rate of low ethylene content EVOH at lower humidity while also having the advantage of the more stable oxygen barrier provided by VDC copolymer at higher humidities.

Thus this invention is directed at multiple layer polymeric films which have low oxygen transmission rates corresponding to the barrier provided by EVOH at low humidities, in combination with oxygen transmission rates corresponding generally to the barrier provided by VDC copolymer at high humidities. The films of the invention are capable of providing at least the barrier properties of the VDC copolymer at all times, and advantageously can provide the better barrier properties of the EVOH during periods when the relative humidity is lower than, for example, about 75%.

SUMMARY OF THE INVENTION

The present invention provides a multiple layer polymeric film having good oxygen barrier properties over a wide range of humidity conditions. In accordance with the invention, a multiple layer polymeric film has a first layer of ethylene vinyl alcohol copolymer, a second layer of a vinylidene chloride copolymer, and preferably a third adhesive layer between the first and second layers. The adhesive layer preferably provides adhesion of at least about 100 g./in. width, as determined by peel strength, to at least one of the layers of vinylidene chloride copolymer and ethylene vinyl alcohol copolymer. Exemplary compositions for the third adhesive layer are EVA with high vinyl acetate (VA) content, especially greater than 15% VA, blends and copolymers of polypropylene, homopolymer or copolymer (PP) with EVA, ethylene methylacrylate (EMA), anhydride modified polypropylene, homopolymer or copolymer (MPP), and anhydride modified ethylene vinyl acetate (MEVA). Also in preferred embodiments, the water vapor transmission rate (WVTR) between the first layer of EVOH and a first outer surface of the film, through the VDC copolymer, is less than the WVTR between the EVOH layer and the second outer surface of the film, away from the VDC copolymer. Typically, the ratio of WVTR through the VDC to the first surface, to the WVTR to the second surface is no more than about 0.25/1.

The films of the invention preferably include a fourth sealant layer, with the second layer of vinylidene chloride copolymer being between the first EVOH layer and the fourth sealant layer. Preferred compositions for the sealant layer are selected from the group consisting of olefin based polymers and copolymers and blends thereof. Exemplary sealant layer compositions for high temperature use are polypropylene homopolymers and copolymers, and polyethylene having a resin density of at least about 0.940, preferably at least about 0.950. Exemplary sealant layer compositions for lower temperature use are EVA, low density polyethylene (LDPE), medium density polyethylene (MDPE), ionomer, and linear low density polyethylene (LLDPE), including densities as low as, for example, about 0.890. A fifth adhesive layer may be positioned between the second layer of VDC copolymer and the fourth sealant layer. Exemplary of materials useful in the composition of the fifth layer are EVA copolymers comprising greater than about 15% vinyl acetate, blends and copolymers of PP and EVA, EMA, MPP, and MEVA.

As a specific example of a film of the invention, one can recite a polymeric film having, in order, a first layer comprising EVOH, a second layer comprising an EVA having greater than about 15% vinyl acetate, a third layer comprising a VDC copolymer, a fourth layer comprising an EVA having greater than about 15% vinyl acetate, and a fifth layer comprising LLDPE.

A second specific example of a film of this invention is a multiple layer film having, in order, a first layer comprising EVOH, a second layer comprising an anhydride modified polypropylene, a third layer comprising a VDC copolymer, a fourth layer comprising an anhydride modified polypropylene, and a fifth polypropylene-based layer.

A third specific example of polymeric films of this invention has, in order, a first layer comprising EVOH, a second layer comprising an anhydride modified EVA copolymer, a third layer comprising a VDC copolymer, a fourth layer comprising an anhydride modified EVA copolymer, and a fifth layer comprising LLDPE.

In the several embodiments of the films of the invention, it is preferred, though not required, that a single adhesive layer be disposed between the layers of EVOH and VDC copolymer, and be in surface-to-surface contact with both the EVOH layer and the VDC layer, and thereby provide at least 100 g./in. width adhesion to both the first and second layers.

In one family of the films of the instant invention, the films comprise a coextruded multiple layer film having a first layer comprising vinylidene chloride copolymer, and a second layer coextruded with the vinylidene chloride copolymer and comprising ethylene vinyl alcohol. It is preferred, though not required, that the coextruded films include the previously-discussed intermediate adhesive layer disposed between the VDC copolymer layer and the EVOH layer.

In some embodiments of the invention, the VDC copolymer comprises vinylidene chloride vinyl chloride copolymer. In other embodiments, a preferred copolymer is vinylidene chloride methylacrylate copolymer.

With respect to fabricating the films of the invention, one method of producing them is coextruding the EVOH and the VDC copolymer, including forming the EVOH into a first layer having an annular shape at a first temperature, forming the VDC copolymer into a second layer having an annular shape at a second temperature considerably lower than the first temperature, combining the first and second layers to form a multiple layer film, and coextruding and cooling the film. Preferably the first temperature of forming the EVOH copolymer is about 380° F. (193° C.) to 420° F. (216° C.). The EVOH and the VDC copolymer layers are preferably simultaneously coextruded through a single coextrusion die, and are preferably formed into annular shape at substantially the same time.

Another, and preferred, method of producing the multiple layer polymeric films of the invention comprises the steps of processing a first composition comprising EVOH in a first extruder and thereby producing a first melt stream, processing a second composition comprising a VDC copolymer in a second extruder and thereby producing a second melt stream, and processing, in a third extruder, and thereby producing a third melt stream of, a polymeric composition capable of bonding in the melted state to at least one of the first and second compositions to provide, in the solid state, an interfacial peel strength of at least about 100 g./in. width. The first, second, and third melt streams are then fed into a coextrusion die, either an annular die or a linear die. In the die, the melt streams are combined, with the third melt stream being between the first and second melt streams. Subsequently, the combined melt streams are fabricated into a multiple layer film in the die, and are extruded out of the die as a coextruded film, and subsequently cooled.

The invention may also be described as a package system comprising a multiple layer packaging material cooperatively defining a package, the packaging material comprising a first layer comprising EVOH, and a second layer comprising a VDC copolymer interposed between the first layer and the product, a product in the package, and an environment on the outside surface of the packaging material having a lower humidity than the humidity at the inside surface of the packaging material. In the packaging material, the incremental WVTR between the first layer of EVOH and a first surface of the packaging material, through the VDC copolymer, is less than the incremental WVTR between the EVOH layer and the second surface of the film, away from the VDC copolymer.

Preferably the packaging material in such a package system includes a fourth heat sealable layer between the product and the second VDC copolymer layer, and a fifth layer, comprising a second bonding layer, between the second VDC copolymer layer and the fourth heat sealable layer. A preferred composition for the fourth layer comprises LLDPE, and for the fifth layer, an EVA copolymer. In some embodiments, however, the fourth layer comprises a propylene-based polymer composition and the fifth layer comprises a carboxy modified propylene-based polymer composition. It is also permissable for the third and fifth bonding layers, as recited most recently above, to comprise anhydride modified EVA, especially where the fourth heat sealable layer comprises LLDPE.

With respect to certain embodiments of the package systems of the invention made with coextruded films of the invention, the package system includes a coextruded multiple layer thermoplastic film, a product inside that film as part of the package system, and an environment on the outside surface of the film having a lower humidity than the humidity at the inside surface of the packaging material. The film has a first layer comprising EVOH, and a second layer comprising VDC copolymer interposed between the first EVOH layer and the product.

Importantly for those packages which are to be exposed to high humidity during the anticipated use life of the package, it is preferred that the WVTR between the first layer of EVOH and the inside surface of the film is less than the WVTR between the EVOH layer and the second (outside) surface of the film, away from the VDC copolymer.

As mentioned with respect to fabrication of films of the invention, it is preferred, in the packages, to have a third layer of an adhesive polymeric material between the first and second layers of EVOH and VDC, respectively.

The invention can also be considered as a method for producing a packaged product. The first step of that method comprising selecting appropriate materials and layer structuring, and fabricating a multiple layer polymeric film. The film has a first layer comprising an EVOH copolymer, a second layer comprising a VDC copolymer, and a third intervening bonding means between the first and second layers. The WVTR between the first layer of EVOH and at least one outer surface of the film, through the VDC copolymer, is less than the WVTR between the EVOH layer and the second outer surface of the film, away from the VDC copolymer. Following fabrication of the polymeric film, the process comprises fabricating the film into a packaging container with the second outer surface of the film, to which water vapor can be most readily transmitted from the EVOH layer, being disposed toward the outside of the package; and positioning a product in the container wherein the product produces a moisture concentration inside the package greater than the ambient moisture outside the package. The fabricated packaging container is then closed and sealed with the moisture, or the moisture-producing contents, inside. In such a package, the layer of VDC copolymer functions as a moisture barrier to protect the EVOH from moisture inside the package, and whereby moisture in the EVOH, and between the EVOH and the outer surface of the package, is transmitted to the outer surface, and thence to the surrounding lower humidity environment, faster than it is transmitted through the VDC copolymer to the EVOH layer. Thus, the moisture content of the EVOH copolymer usually reflects the ambient moisture conditions outside the package, more than the moisture conditions inside the package. The lower the ratio, of the WVTR to the package inside, is to the WVTR to the package outside, the closer the EVOH will reflect the outside moisture conditions.

Those embodiments of the packages of the invention which provide lower WVTR ratios, such as, for example no greater than about 0.25/1, preferably about 0.15/1, more preferably about 0.05/1, allow the EVOH to reflect the ambient moisture conditions of the outside environment, and are advantageously adapted for being processed through a high moisture environment, such as a retort autoclave, and subsequently returned to a lower moisture environment, such as the ambient atmosphere. In films so made, and treated by such a process, the packaging film absorbs moisture from the high moisture environment and subsequently gives off that moisture, especially that which is between the EVOH copolymer and the outside surface of the package, to the low moisture environment on the outside surface of the package. The result of such processing, including the absorption of the moisture and the giving off of the moisture, is that the oxygen barrier of the packaging film is reduced only to about the level of oxygen barrier provided by the less moisture sensitive VDC copolymer layer, when the film absorbs the moisture, and is restored to about the level of oxygen barrier provided by the EVOH copolymer as the film gives off the moisture in and to the lower moisture environment.

DETAILED DESCRIPTION OF THE ILLUSTRATED EMBODIMENTS

Figure 1:
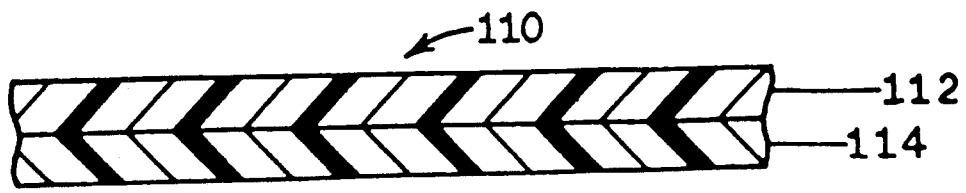
FIG. 1 shows a cross-section of a two layer film of this invention.
Figure 2:
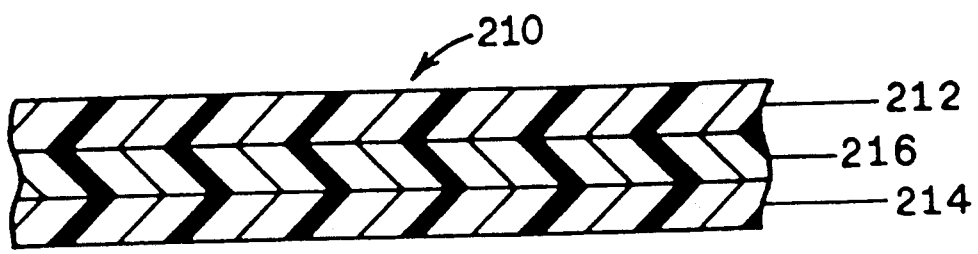
FIG. 2 shows a cross-section of a three layer film of this invention.

Turning now to the drawings, it is seen that FIGS. 1-6 show cross-sections of representative films of the invention. It will be noted that, through the drawings, the first digit of the numbering sequence indicates the figure number and the second and third digits indicate the element being identified. With respect to FIG. 1, the two layer film is identified overall by the number 110. In FIG. 2, the overall film (here a three layer film) is identified by the number 210. Similarly, the films in FIGS. 3, 4, 5, and 6 are identified by the numbers 310, 410, 510, and 610 respectively.

Each of the films of the invention have, as essential components, a first layer comprising ethylene vinyl alcohol copolymer, and a second layer of vinylidene chloride copolymer. And indeed the simplest form of the invention may contain only these two layers as seen in FIG. 1, wherein layer 112 comprises the ethylene vinyl alcohol copolymer, and layer 114 comprises the vinyldiene chloride copolymer.

While the two layer film of FIG. 1 is satisfactory for providing certain of the properties and characteristics desirable in films of the invention, namely oxygen barrier which is relatively insensitive to humidity and moisture, preferred films contain additional layers which provide additional desirable features. Particularly referring now to FIG. 1, applicants have determined that there is minimal interlayer attraction between the EVOH layer and the VDC layer. So it is preferred to provide an adhesive layer as at 216 in FIG. 2 between EVOH layer 212 and VDC layer 214. A typical adhesive composition useful in layer 16 is EVA having greater than about 15% VA, and usually ranging from about 18% to about 38% VA. A second typical adhesive is a blend or copolymer of EVA with polypropylene, either homopolymer or copolymer. Still other acceptable adhesives are EMA, anhydride modified polypropylene, homopolymer or copolymer, and anhydride modified ethylene vinyl acetate. The referred-to anhydride modifications may be copolymer units, or may be blends of the modified material with unmodified polymeric material. Other suitable polymeric adhesives will now be obvious to those skilled in the art of pollymer films.

The films of FIG. 2 are superior to the films of FIG. 1 in that they typically provide enhanced adhesion between EVOH layer 12 and VDC layer 14, by means of adhesive layer 16.

Figure 3:
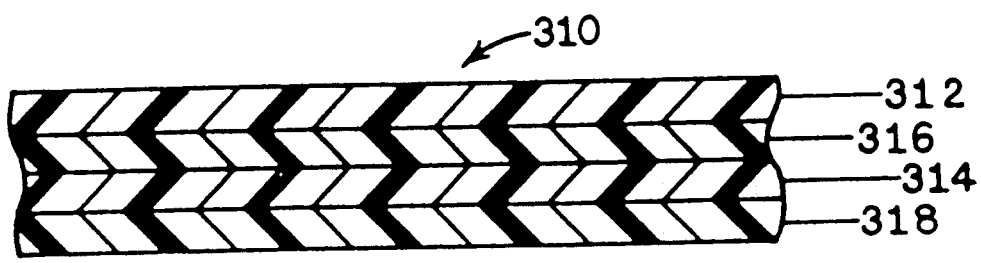
FIG. 3 shows a cross-section of a four layer film of this invention.

In order to provide, in the films of the invention, the ability to efficiently and economically fabricate packages using only adhesion inherent in the films of the invention, it is desirable to include, in the film, a sealant layer 318 illustrated in FIG. 3, whereby the film can be fabricated into a package, for example a pouch, by heat seals formed about the periphery of the formed container. The composition of sealant layer 318 is selected with respect to its temperature tolerance, as well as its adaptability to being combined into the structuring of the film. Accordingly, exemplary sealant layer compositions for use at high temperatures, such as in retort structures which are subjected to processing conditions up to about 275° F., are sealant layer compositions based on polypropylene homopolymer or copolymer, and polyethylene having a resin density of at least about 0.940, preferably at least about 0.950. Exemplary sealant layer compositions for lower temperature use are EVA, LDPE, MDPE, ionomer, and LLDPE including densities as low as about 0.890. The higher density LLDPE's can also sometimes be used for higher temperature applications. Modifying additives may, of course, be used as appropriate. Thus the film of FIG. 3 comprises a first layer 312 of EVOH, a second layer 314 of VDC, a third adhesive layer 316, and the sealant layer 318.

Figure 4:
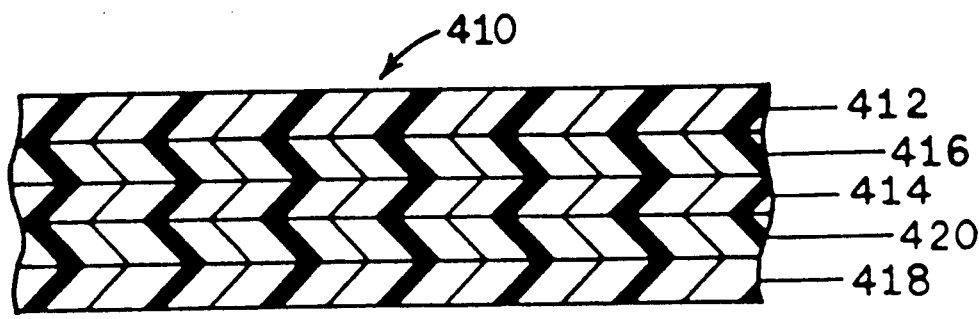
FIGS. 4 and 6 show cross-sections of five layer films of this invention.

In FIG. 4, the EVOH layer is indicated as 412, and the VDC layer is indicated as 414. Adhesive layer 416 corresponds to the adhesive layers 216 and 316 similarly recited for FIGS. 2 and 3. Layer 418 corresponds to the sealant layer indicated as 318 in FIG. 3. Layer 420 is an adhesive between the VDC copolymer layer 414 and the sealant layer 418, and is provided for the purpose of improving the adhesion between layers 414 and 418. The composition of adhesive layer 420 may be selected from among the materials recited for the composition of adhesive layer 16. Thus typical materials would be the EVA's with vinyl acetate content greater than about 15%, blends and copolymers of EVA with polypropylene, EMA, MPP and MEVA. While the compositions of adhesive layers 16 and 20 may be the same, and for simplicity of the chemistry of the structure are preferred to be the same, it is highly acceptable that different materials may be used for layers 16 and 20. This is especially desirable where the adhesion between the corresponding layers is improved by the selection of different adhesive materials for layers 16 and 20.

Adhesive layer 16 may be used for providing adhesion to either EVOH layer 212, or VDC layer 214, or both. Where the adhesive layer 16 is bonded to only one of layers 12 and 14, it is in surface-to-surface contact with only that layer, and is then in surface-to-surface contact with some other intervening layer (not shown) between layer 16 and the other of layers 12 and 14. In the preferred embodiments, though, adhesive layer 16 is in surface-to-surface contact with, and thus is bonding to, both layers 212 and 214. Correspondingly, adhesive layer 420 may be in surface-to-surface contact with, and therefore bonding to, only one of VDC layer 14 and sealant layer 18, in which case it is then in surface-to-surface contact with an intervening layer (not shown) between layer 20 and the other of layers 14 and 18. However, it is again preferred that the adhesive layer 420 be in contact with both layer 14 and layer 18, thus bonding those two layers directly together.

The film of the invention may be fabricated by a variety of processes. The processes may include such steps as extrusion, coextrusion, lamination, extrusion-lamination, coextrusion-lamination, and the like. The preferred process for fabricating films of the invention is the coextrusion process, accompanied by its attendant economies. In the coextrusion process, it is preferred that all the layers of the film be coextruded simultaneously through a single die. Tubular coextrusion is acceptable. However, exemplary of a preferred process for efficiently producing films of the invention is the cast coextrusion process wherein the compositions of the several layers are processed through corresponding extruders to produce melt streams which are then fed into a coextrusion die. In the die, the melt streams are combined and fabricated into the multiple layer film which is extruded from the die opening, preferably onto a chill roll where the polymers are cooled and solidified.

Figure 7:
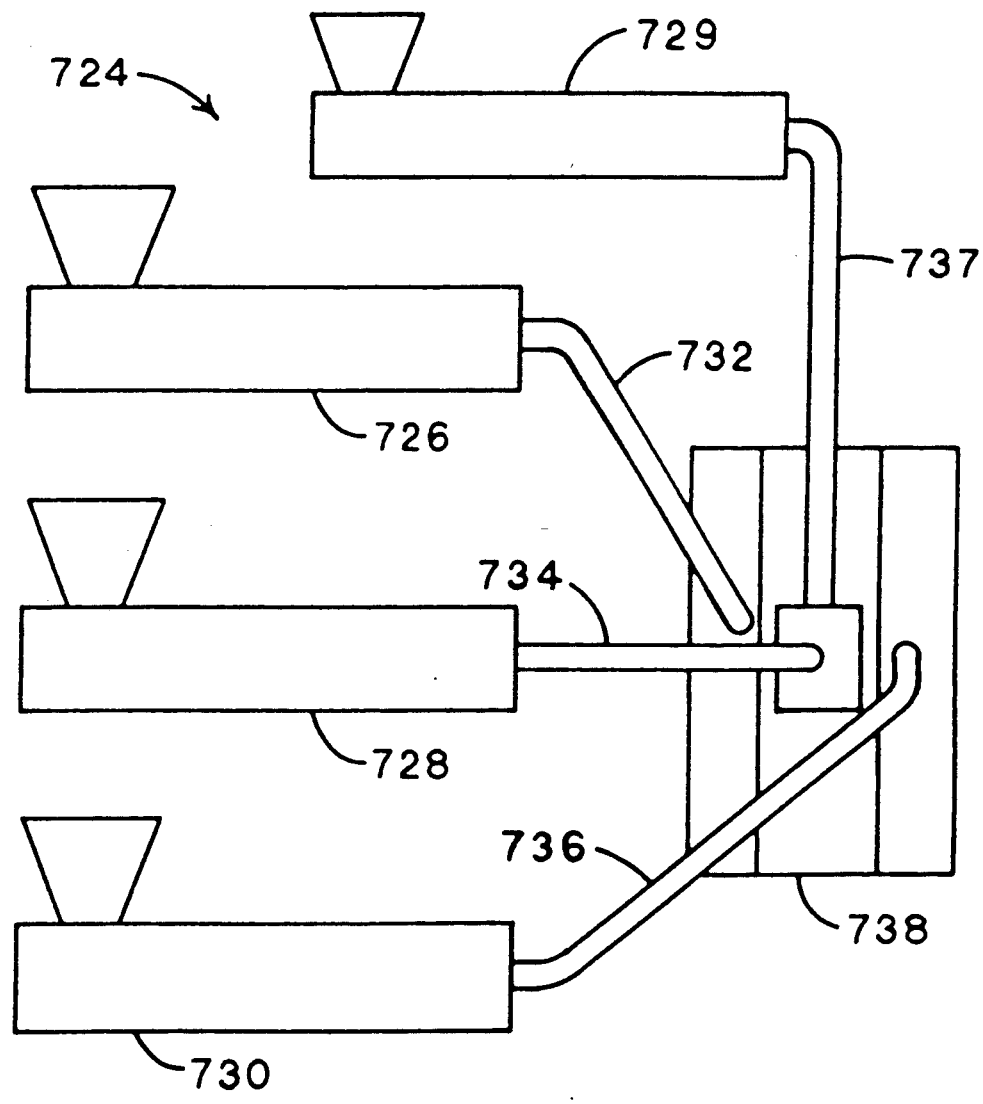
FIG. 7 shows a general layout of extrusion apparatus for fabricating the films of this invention.
Figure 8:
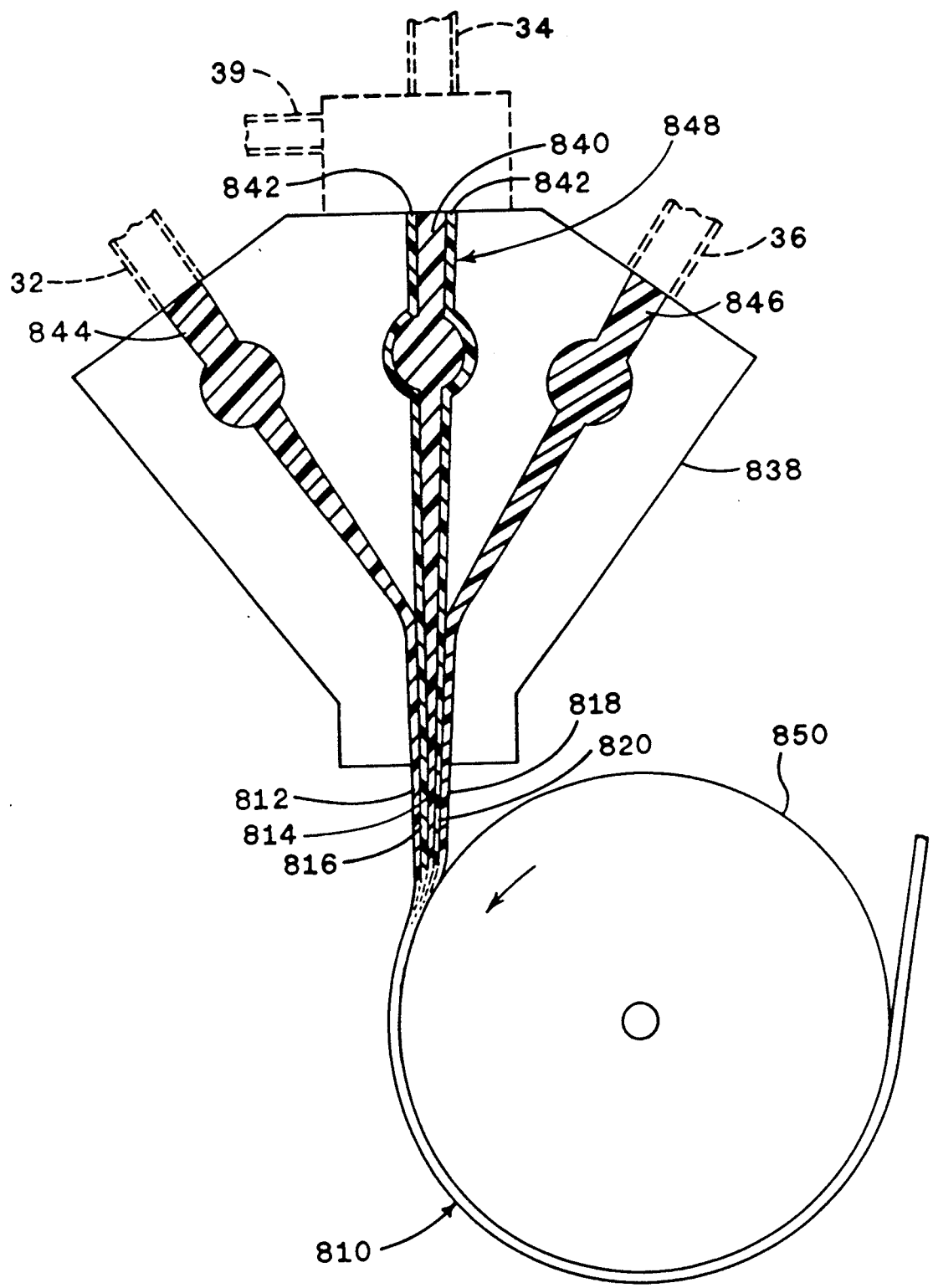
FIG. 8 shows a cross-section of a die of FIG. 7, and film cooling apparatus used with the extrusion apparatus of FIG. 7, along with a cross-section of a five layer film being fabricated in the die.

FIG. 7 illustrates, in block diagram form, a combination of apparatus 724 for use in cast coextrusion of five-layer films of the invention, such as 410 of FIG. 4. Extruders 726, 728, 729, and 730 are used to process four separate polymeric compositions corresponding to layers 412, 414, 416, 418, and 420, layers 416 and 420 having the same composition for purposes of this illustration. Extruder 726 processes the EVOH for layer 12. Extruder 728 processes the VDC copolymer for layer 14. Extruder 729 processes the adhesive for layers 17 and 20. Extruders 730 processes the sealant for layer 18. The melt streams 840 and 842 (See FIG. 8) from extruders 728 and 729, respectively, pass through connecting pipes 734 and 737 to a combining adapter, shown in dashed outline in FIG. 8, where they are combined, with the adhesive melt stream 842 positioned on both sides of VDC melt stream 840 to thus create a 3-layer melt stream 848 which is fed to die 838. The melt streams 844 and 846 from extruders 726 and 730, respectively, pass through connecting pipes 732 and 736 directly to die 38. In the coextrusion die 38, the melt streams 844 and 846 are combined with the 3-layer melt stream 848 to fabricate, in the die, the 5-layer melt stream which is extruded from the die 38.

As the 5-layer melt stream is extruded from die 38, it is cast onto a chill roll 850 which is maintained at a controlled temperature, for example 90° F., conductive for solidifying film 810 in fabrication of the film comprising the five layers 812, 814, 816, 818, and 820. After the film has been fabricated in the die and solidified on chill roll 850, it is then either wound up or further processed according to conventional film processes.

Figure 9:
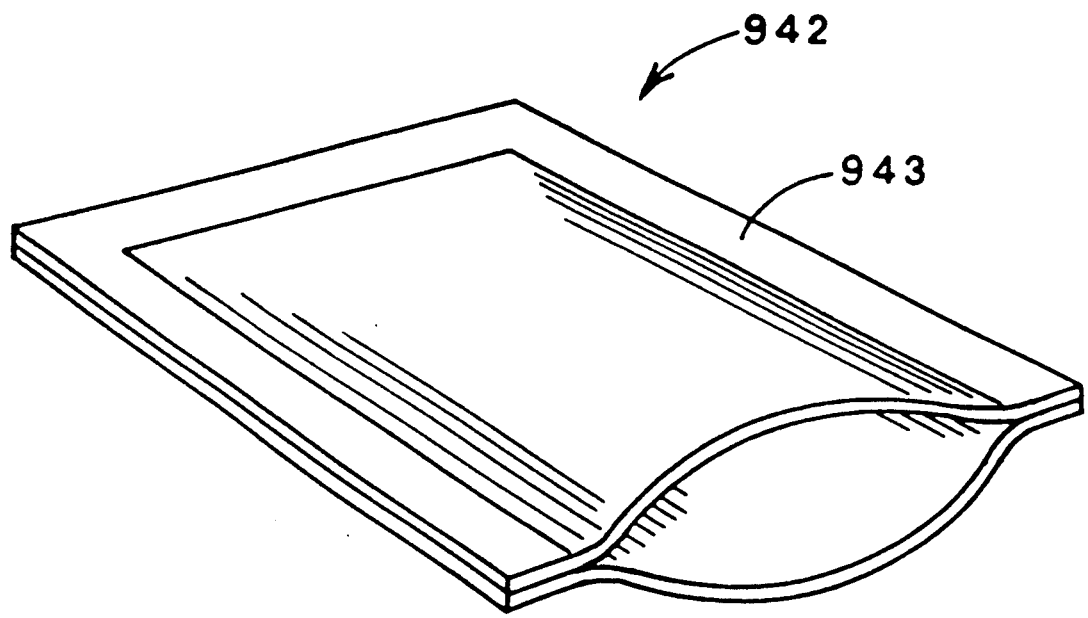
FIG. 9 shows a pouch fabricated with film of the invention.
Figure 10:
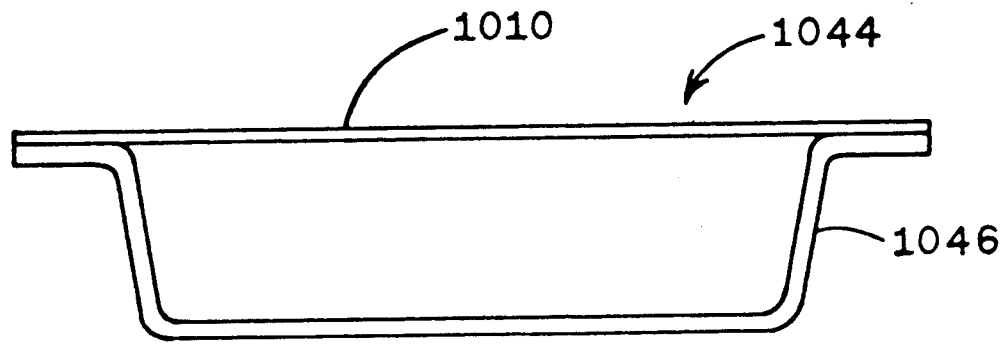
FIG. 10 shows a cross-section of a package formed from a semi-rigid tray, and having a lid made with a film of the invention.

FIGS. 9 and 10 indicate packages which can readily be fabricated using films of the invention, and especially the films which include a sealant layer 18. The pouch 942 shown in FIG. 9 is typically fabricated by bringing two sheets of the film into surface-to-surface relationship with each other and providing heat seals 943 about the periphery thereof. Alternatively, a portion of the sheet material may be folded onto itself with the corresponding sealant layer portions facing to the inside of the fold, and seals fabricated about the facing surfaces of the folded over sheet.

Another example of packages which may be fabricated using films of the invention is that shown at 1044 in FIG. 10. A tray 1046 is typically formed as by a thermoforming process from a sheet which is typically thicker than the films commonly made in this invention. The films of the invention are between about 1 mil and about 25 mils thick, but are preferably between about 1.5 and 10 mils thick. The preferred thicknesses provide films which have a high degree of flexibility, the films thus being useful in various of the flexible packaging applications. Thicker films may be made, but are typically more expensive than necessary in order to provide the advantages attendant flexible packaging films.

In the case of the package shown in FIG. 10, which encloses a space 1045 between lower package member 1046 and lid 1010, the lower package member 1046 is a pre-formed tray which is fabricated from a thicker material such as, for example, by thermoforming a sheet which is between 40 mils and 80 mils thick in order to achieve a tray which has thicknesses on the order of 10–30 mils more or less in the tray bottom. This provides a tray which has a degree of rigidity typically desired in packages of this type. The lid 1010 of the package is a film of the invention as illustrated, for example, in FIGS. 1–6.

In fabrication of sealed packages using films of the invention, the sealant layer 18 may be used to fabricate the seals where it is present. Where no sealant layer is present as part of the film 10, then additional adhesive materials will typically be used between the facing surfaces to be sealed together. Where the sealant layer 18 is used, portions of the facing surfaces are brought into surface-to-surface contact when the seal is formed between the respective facing film portions.

The vinylidene chloride copolymer used in the films of this invention may be any of the available vinylidene chloride copolymers, especially those containing vinyl chloride or acrylate comonomers, especially methylacrylate. Vinylidene chloride vinyl chloride copolymers have a typical extrusion temperature of about 310° F. to about 330° F. in contrast to typical ethylene vinyl alcohol copolymers which have extrusion temperatures of typically over 375° F. Thus in fabricating the films of the invention by the coextrusion process, the melt streams are fabricated in the corresponding extruders at the desired temperatures, and the melt streams are exposed to the alternate temperatures only in the die. Since a higher temperature is required for the EVOH, than for the VDC, in order to insure its continuing fluidity in the die, at least part of the die is maintained at the higher temperature. The VDC copolymer is thus exposed to at least a portion of the higher temperature required by the EVOH during at least part of its passage through the die, as it passes through in the process of being fabricated, along with the other melt streams, into the multiple layer film which is extruded from the die. Thus the EVOH is fabricated into a melt stream, and eventually into a film shape at a higher temperature, for example 390° F. to 410° F., whereas the vinylidene chloride copolymer is fabricated into a melt stream at a lower temperature, for example, about 310° F. to about 330° F. Temperatures of the melt processing of the EVOH and the VDC copolymers depend, of course, on the specific copolymers being processed. For example, a vinylidene chloride vinyl chloride copolymer is preferably processed between 320° F. and 330° F., whereas a vinylidene chloride methyacrylate copolymer is preferably processed at a slightly lower temperature, such as 310° F. to 320° F.

A significant feature of this invention lies in providing the proper arrangements of the layers in fabricating the films, and of the films in fabricating packages of the invention, and especially in packages which contain products which produce a higher humidity on the inside of the package than is present in the expected ambient conditions on the outside of the package. Namely in those cases where the inside of the package experiences a higher humidity than the ambient outside conditions, it is highly desirable to arrange the films of the invention in the package such that the vinylidene chloride copolymer layer 14 is between the product and the ethylene vinyl alcohol copolymer. In this arrangement, the VDC copolymer acts as a moisture barrier between the EVOH and the moisture inside the package, thus controlling the incremental rate of transmission of moisture from the inside of the package, through the VDC copolymer layer, to the EVOH layer. It is further important that the barrier to moisture transmission between the EVOH layer and the outside of the package be substantially less than the moisture barrier between the EVOH layer and the inside of the package. Thus, in the packaging films of the invention for use with moist products, the layers positioned inwardly of the EVOH layer provide more moisture barrier than any layers which may be positioned outwardly of the EVOH. In films of the invention, the VDC copolymer is primarily responsible for providing good moisture barrier in the film. Thus it is positioned, in the packages, toward the inside of the package, from the EVOH layer 12, in cases where the humidity inside the package is greater than the humidity outside the package.

FIGS. 1–4 show the EVOH as the outer surface of the film for simplicity. And especially where a film of the invention is fabricated using a coextrusion process, it is preferred that the EVOH be an outer layer of the layers which are coextruded, as in FIGS. 1–4.

It is preferred, though, that a more abuse resistant material constitute the outer layer of the film when it is fabricated into a package. So a layer 522 of an abuse resistant material, such as polyethylene terephthalate (PET), polyamide, polycarbonate, or the like, is typically mounted on the EVOH layer 12, for example by means of an adhesive layer 523 such as a curing type urethane adhesive. The adhesive for layer 523 is, of course, selected in light of the specific compositions of layers 512 and 522.

Figure 5:
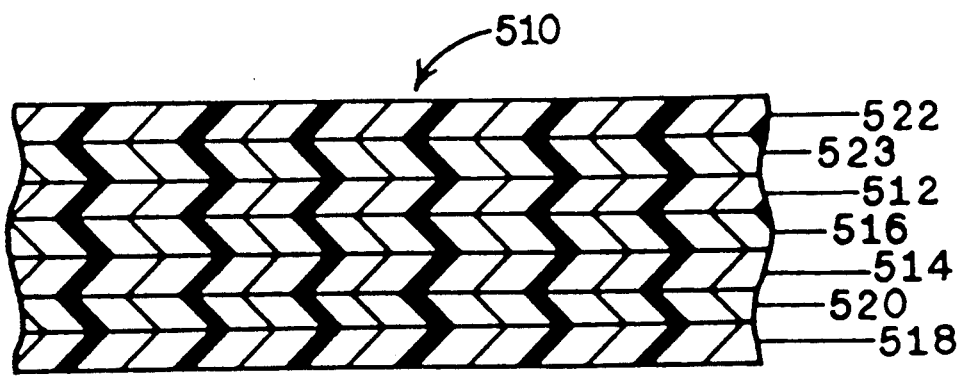
FIG. 5 shows a cross-section of a seven layer film of this invention.

FIG. 5 represents a typical 2.5 mil thick film of the invention for which the moisture barrier can be calculated. For purposes of determining moisture barrier, the adhesive layers 516, 520, and 523 are all considered to be less than 0.1 mil thick, and to provide nominal incremental moisture barrier, so their contribution is ignored, for purposes of simplicity in estimating moisture barrier properties. The EVOH layer 512 provides the base layer from which incremental moisture barrier is calculated. Incremental moisture barrier is that barrier provided by an increment of the film thickness. The increments selected for comparison herein correspond to the thicknesses between the corresponding layer interfaces. In this example, the EVOH layer 512 is 0.5 mil thick. The VDC copolymer is vinylidene chloride methylacrylate copolymer (VDC-MA) 0.5 mil thick. The sealant layer 518 is LLDPE 1.0 mil thick. The abuse resistant layer is PET 0.5 mil thick. Outwardly of the EVOH, the moisture transmission rate depends on the outer layers, namely the 0.5 mil of PET, and is about 50 g./m² day at 60% relative humidity. Inwardly of the EVOH, the incremental moisture transmission rate is a combination of the rates of the inner layers which are between the EVOH layer and the inner film surface, namely VDC copolymer layer 14 and LLDPE layer 518. That combined rate is about 1.6 g./m² day. Thus, the ratio of the incremental moisture transmission rate of the inner layers to the incremental moisture transmission rate of the outer layers is about 1.6/40, or about 0.04/1.

In the above illustration, both the EVOH layer and the VDC layer were 0.5 mil thick, for a total thickness of 1.0 mil for the two layers. When the thicknesses of the two layers are rearranged such that the VDC layer is made as thin as possible while still being subject to coextrusion, its thickness is about 0.1 mil. If the EVOH is correspondingly thickened so that the sum of the thicknesses remains 1.0 mil, it is then 0.9 mil thick. In such a film, kept otherwise the same, the incremental moisture transmission rate of the layers inward of the EVOH is about 6 g./m² day. The incremental moisture transmission rate of the layers outward of the EVOH remains at 40 g./m² day. Thus, in this case, the ratio of the incremental moisture transmission rates of the inner layers to the outer layers is about 6/40, or about 0.15/1.

The ratio of the incremental moisture transmission rates of the inner layers to the outer layers should be no more than about 0.25/1, preferably no more than about 0.5/1, and is generally no more than about 0.05/1 for the preferred films of this invention which exhibit the desired excellent oxygen barrier along with the reduced sensitivity to moisture. Further, the overall WVTR across the entire thickness of the packaging material should be low enough to provide for stable moisture content of the package product, and is usually less than about 6 g./m² day when the VDC layer is VDC-MA 0.1 mil thick and the outside relative humidity is about 60%. This is generally provided for quite adequately by the moisture barrier properties of the VDC copolymer layer 14. Other materials do, of course, participate in providing moisture barrier depending on the film structure, relative layer thickness, and the ambient conditions at the film surfaces.

By providing the higher moisture barrier increment in the inner layers, the films thus have the capability to discharge moisture from the EVOH layer to a lower humidity environment outside the package faster than moisture is transmitted to the EVOH layer from inside the package. Where the moisture barrier of the outside layers is relatively small, the humidity in the EVOH layer 12 thus closely follows the humidity to which the outside of the package is exposed. So when the outside of the package is exposed to high humidity, the EVOH layer absorbs moisture which greatly reduces the oxygen barrier contribution of the EVOH. But the VDC layer is not so affected. Its oxygen barrier contribution remains approximately constant. Thus the oxygen barrier of the packaging film is maintained at approximately the level contributed by the VDC copolymer.

When the lower humidity is restored on the outside of the package, the moisture in the EVOH is quickly discharged to the lower moisture outside environment, through any outer layers which provide lower moisture barrier. As the moisture in the EVOH layer is quickly discharged, the oxygen barrier properties of the EVOH layer are accordingly restored.

Figure 11:
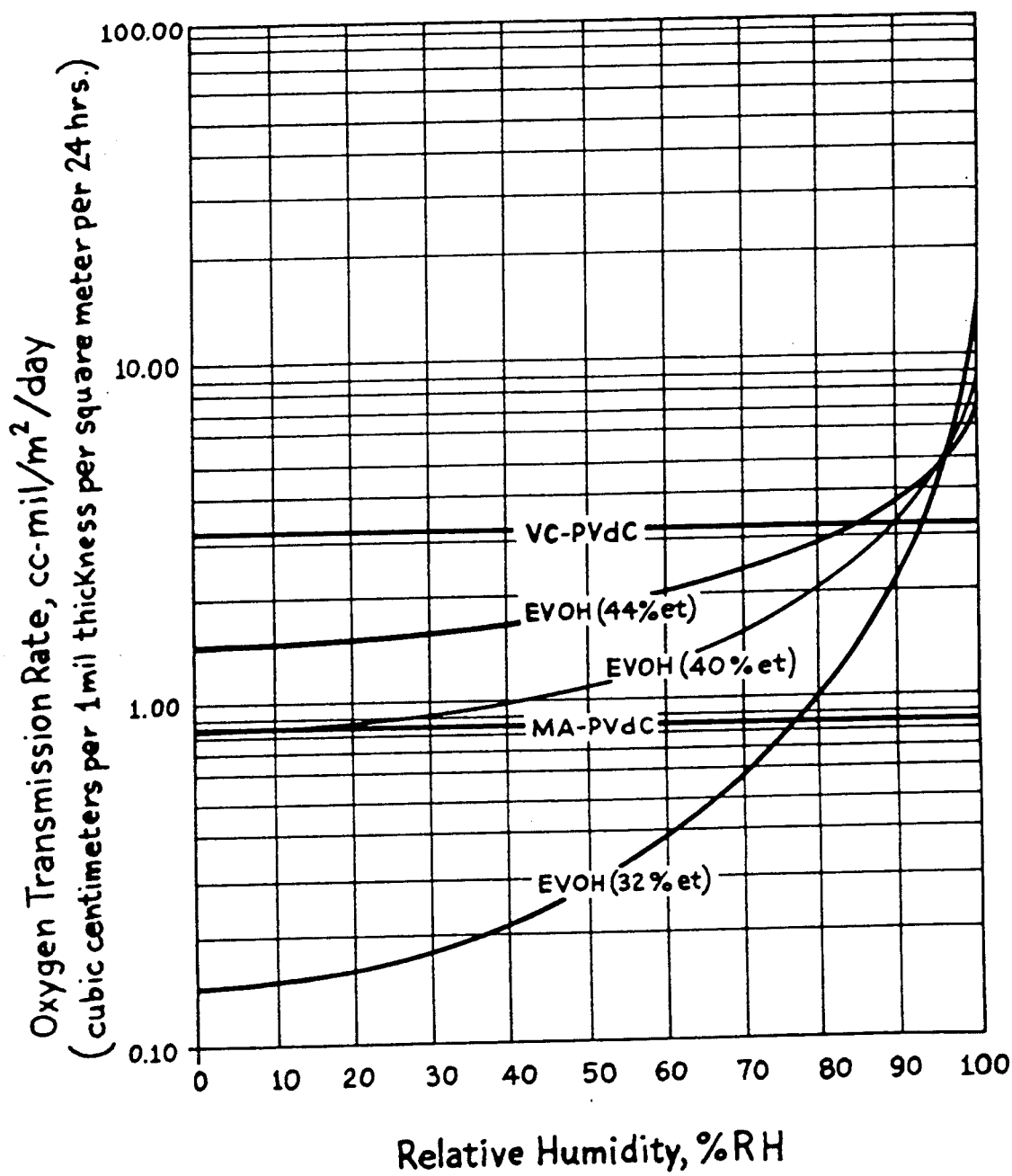
FIG. 11 shows graphically the relative oxygen permeabilities of representative EVOH and VDC copolymers.

The oxygen barrier properties of representative EVOH copolymers and vinylidene chloride copolymers are illustrated in FIG. 11. All tests represent the oxygen transmission rate (OTR) of films 1 mil thick. as shown therein, conventional vinylidene chloride vinyl chloride polymer (VDC-VC) has an OTR of about 3.25 g./m² day. VCD-MA has an OTR of about 0.85 g./m² day. FIG. 11 shows that OTR of the VDC copolymers does not vary much with changing humidity.

FIG. 11 also shows that the OTR of EVOH films is less that the OTR of some of the VDC films at low humidity, but is greater than the OTR's of the VDC films at high humidity. For example, the OTR of EVOH containing 32% ethylene is about 0.15 g./m² day at 0% relative humidity (R.H.) whereas that of VDC-MA is about 0.85, and of VDC-VC is about 3.25. However, at about 75% R.H., the OTR of VDC-MA and that EVOH are about equal. Above about 75% R.H., the OTR of the EVOH is worse, however it is still better than that of VDC-VC, up to about 92% R.H.

As seen in FIG. 11, the OTR of EVOH is influenced by ethylene content. Thus, as seen in FIG. 11, EVOH containing at least 40% ethylene generally has an OTR that is equal to, or greater than, the OTR of VDC-MA at all humidities. But it is still better than the OTR of VDC-VC up to about 85%-90% R.H.

In some applications for which the films of the invention are anticipated to be used, the films are temporarily exposed to high humidity and high temperature, such as by retort processing in a high temperature autoclave, followed by return to a lower humidity and lower temperature environment after the processing is completed. During the period of the autoclave processing, which typically uses steam or hot water, the packaging film, including the EVOH layer 12, absorbs moisture from the process hot water or steam. The absorbed moisture of, course, causes the oxygen barrier properties of the EVOH to be reduced according to the known sensitivity of the EVOH under high temperature and high moisture conditions. However, the VDC copolymer layer 14 is not so affected. Indeed, it maintains its oxygen barrier properties at the same general level in wet environments as well as dry, as seen in FIG. 11. So during the autoclave processing, the oxygen barrier properties of the film generally reflect those of the VDC copolymer layer 14. After the autoclave processing is completed, and the package is removed from the high moisture environment, the package film from the EVOH layer 12 outwardly to the outer surface of the package gives off the moisture which was picked up in the autoclave process. Namely, the outer layer, or layers, of the package, from the EVOH layer outwardly, gives off its moisture to the lower moisture surrounding environment. As the moisture is given off, and especially as the moisture leaves EVOH layer 12, the oxygen barrier properties of EVOH layer 12 are accordingly restored. Thus, at any time that the package is in the low humidity environment, the oxygen barrier properties of the package reflect generally the oxygen barrier properties of the EVOH at those low humidities. There is, of course, a recovery time period where the EVOH is in the process of reaching equilibrium with the outside environment, whether wet or dry, wherein the oxygen barrier properties of the package are intermediate.

Turning now to specific examples of films of the invention, the following structures are representative of films which exhibit the desirable properties of films of the invention:

/EVOH/EVA/VDC/EVA/LLDPE/
/EVOH/MPP/VDC/MPP/PPE/
/EVOH/MEVA/VDC/MEVA/LLDPE/
/PET/urethane adhesive/EVOH/MEVA/VDC/MEVA/LLDPE/
MPP = anhydride modified polypropylene.
MEVA = anhydride modified ethylene vinyl acetate.

EXAMPLE 1

A four layer film as illustrated in FIG. 3 is made. The EVOH is GL-ET from Nippon Gohsei having an ethylene content of 38%. The tie layer 16 is Plexar 2965, an anhydride modified EVA. Layer 14 is vinylidene chloride vinyl chloride copolymer. Layer 18 is an EVA composition containing about 9% vinyl acetate. The film is fabricated by coextruding the polymers in fabrication of the four layer film. The temperature of the EVOH going into the die is about 395° F. The temperature of the Plexar 2965 going into the die is about 350° F. The temperature of the VDC copolymer going into the die is about 326° F. The temperature of the EVA comprising layer 18 varies between 360° F. and 400° F. during the trial. The several polymers are formed into tubular layers, and a tubular tape is extruded form the annular die at a thickness of approximately 15 mils. Samples of the tape are then thermoformed in fabrication of trays approximately 2 inches deep by 4 inches square. The thickness of the resulting thermoformed material is approximately 1.5 mil. The oxygen barrier of the resulting material is as shown in Table 1.

TABLE 1

| OXYGEN PERMEABILITY, CM$^3$/M$^2$ DAY | | |
|---|---|---|
| % Relative Humidity, low humidity side | EVOH side at Low humidity | EVOH side at High humidity |
| 50% | 3.2 | 26.4 |
| 50% | 3.7 | 27.3 |
| 75% | 6.5 | 23.2 |
| 75% | 6.5 | 27.3 |
| 75% | 7.9 | 30.1 |
| 100% | 25.4 | 28.7 |
| 100% | 19.4 | 22.2 |
| 100% | 20.4 | 23.1 |

The oxygen permeabilities in Table 1 are determined on an Oxtran Oxygen Analyzer by exposing one surface of the film to 100% humidity. The other surface of the film is then exposed to humidities of 50%, 75%, or 100%, and the oxygen transmission measured. By thus measuring the oxygen transmission rate where there is a moisture differential across the two surfaces, one can simulate, and therefore evaluate, the performance of the film in a package which contains a wet product, and wherein the outside of the package is exposed to the normally lower humidity of the outside ambient environment, i.e. 50% or 75% relative humidity.

Figure 6:
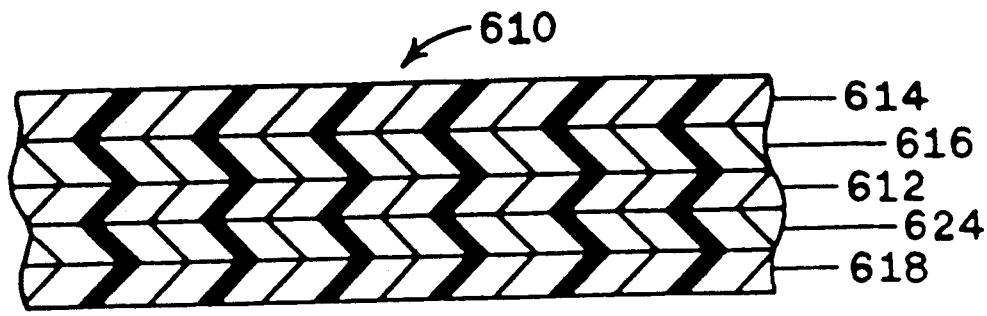

Similarly, if a dry product is being packaged, superior oxygen barrier is achieved by positioning the EVOH between the VDC and the product, since the dry product then represents the dry side of the packaging film. For heat sealable packaging films, using these embodiments, the EVOH layer 12 is between the VDC layer and the sealant layer 18. Representative of such films is that seen in FIG. 6. In FIG. 6, layers 612, 614, and 616 represent the EVOH layer, the VDC layer, and the intervening adhesive layer, respectively. Layer 618 is the sealant layer such as illustrated in FIGS. 3 and 4. Layer 624 is an adhesive such as those described for layers 216, 316, and 416.

EXAMPLE 2

A five layer film as in FIG. 4 is cast coextruded. The EVOH is Soarnol D from Nippon Gohsei. Ethylene content of Soarnol D is 29%. The VDC copolymer in layer 14 is Dow 119 vinylidene chloride methylacrylate copolymer. The vinylidene chloride copolymer contains additives for the typical heat stabilization requirement. The sealant layer 18 is Dow 3010 linear low density polyethylene. The composition of adhesive layers 16 and 20 is, in both cases, Plexar 326 anhydride modified EVA.

The temperatures of the melt streams of EVOH and LLDPE are both about 400° F. going into the die. The temperature of the adhesive Plexar 326 is approximately 320° F. going into the die. The temperature of the Dow 119 vinylidene chloride methacrylate copolymer is approximately 315° F. going into the die. The material is then combined in the die and fabricated into a multiple layer film such as that shown in FIG. 4. The film extruded from the die is approximately 2.6 mils thick. The EVOH layer is about 0.3 mil thick. the VDC copolymer is about 0.6 mil thick. The tie layers of Plexar 326 are about 0.1 mil thick. The LLDPE is about 1.5 mil thick.

The film so produced is then tested for oxygen transmission at a range of relative humidities as described in EXAMPLE 1. When the film is tested with the EVOH layer to the low humidity side, simulating the VDC copolymer as being between the EVOH and the moist product, the oxygen permeability measured is that illustrated in FIG. 12 by solid line "A. " When the arrangement of the film is reversed such that the EVOH is between the VDC copolymer and the moist side of the film, the oxygen transmission rate is as illustrated by curve "B" in FIG. 12. Curve "C" in FIG. 12 represents the calculated oxygen transmission rate of a single layer film of the same Soarnol D EVOH, the same thickness, as that of the EVOH layer in the EXAMPLE 2 film, namely 0.3 mil thick.

Figure 12:
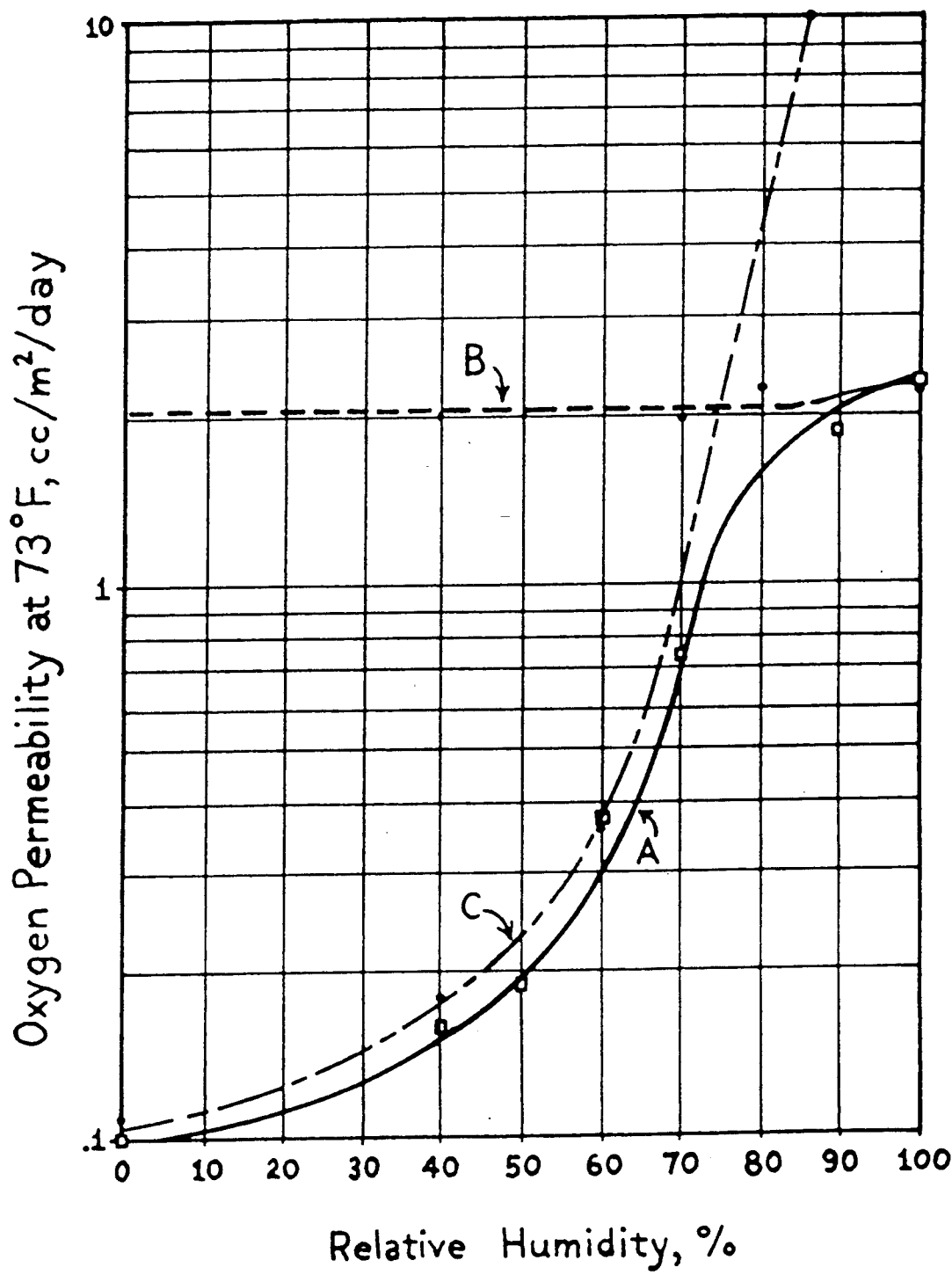
FIG. 12 shows graphically the oxygen permeability of films of the invention and makes a comparison with oxygen permeability of a single layer film of EVOH having a comparable EVOH thickness.

Accordingly, FIG. 12 shows (curve B) that when the EVOH is turned toward the inside of a package, which is simulated by the high humidity side of the oxygen tester, the oxygen permeability is relatively constant at all humidities existing on the other surface of the film, namely that represented by the outside surface of the package, and approximates the oxygen permeability of the VDC-MA copolymer layer at the stated 0.6 mil thickness of VDC-MA. Correspondingly, curve "A" indicates that, with the EVOH disposed toward the outside of the package, namely the VDC copolymer between the EVOH layer and the product, and wherein the EVOh is above to discharge moisture to a lower humidity ambient environment, namely under about 75% R.H., the oxygen permeability of the film is lower than the oxygen permeability of the VDC copolymer, and rather is controlled by the superior oxygen barrier properties of the EVOH. As a result, packages made with films of the invention, and wherein the VDC copolymer is approximately positioned between the EVOH and the product, and wherein the EVOH can discharge moisture to the outside environment adjacent the package, the package enjoys the benefits of the lower oxygen permeability of the EVOH at lower humidities, for example under about 75% relative humidity as seen in FIG. 12, and yet does not have the extreme oxygen sensitivity which is characteristic of films wherein EVOH is the sole source of the oxygen barrier. Rather its maximum oxygen permeability is controlled by the VDC copolymer such that is never exceeds, generally, the level of oxygen permeability which is normally associated with the corresponding VDC copolymer at the thickness being used.

EXAMPLE 3

A film is coextruded as in Example 2, with appropriate adjustments being made in melt processing temperatures for the different polymers. Layer 12 is EVOH. Layer 14 is vinylidene chloride methacrylate copolymer. Layers 16 and 22 are QF-500 anhydride modified polypropylene from Mitsui Petrochemical. Layer 418 is a propylene ethylene copolymer.

EXAMPLE 4

A film is made as in Example 3. Layer 12 is EVOH. Layer 14 is a vinylidene chloride methylacrylate copolymer. Layer 18 is linear low density polyethylene. Layers 16 and 20 comprises ethylene vinyl acetate copolymer containing about 28% vinyl acetate.

EXAMPLE 5

A film is made as in EXAMPLE 4 except that the composition of layer 14 is vinylidene chloride vinyl chloride copolymer.

EXAMPLE 6

A film is made as in EXAMPLE 4. Each of the adhesive layers, as at 16 and 20, are about 0.1 mil thick. the EVOH contains 32% ethylene and its layer 12 is 0.5 mil thick. The VDC is VDC-MA and its layer 14 is 0.5 mil thick. The sealant layer 18 is LLDPE about 1.0 mil thick. A 0.5 mil film of PET is adhesive laminated to the EVOH layer using a curing-type urethane adhesive to make a 7-layer film as shown in FIG. 5.

COMPARATIVE EXAMPLE 6

A 2.5 mil film is made as in EXAMPLE 6 except that an additional 0.5 mil of EVOH is used in place of the 0.5 mil of VDC-MA and the adhesive layer 16.

Figure 13:
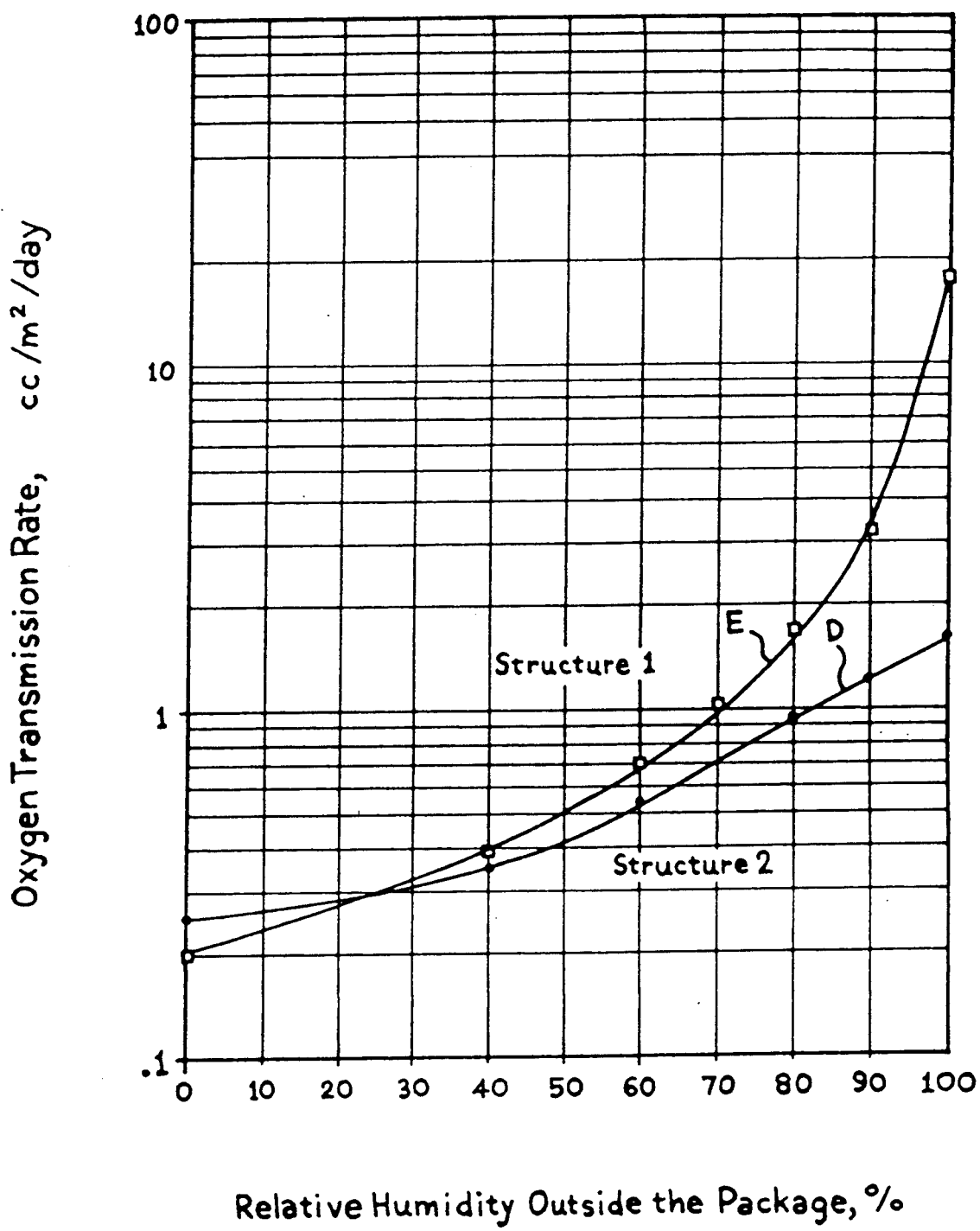
FIG. 13 shows graphically the advantage of the combination of an EVOH layer and a VDC layer in a film, compared to using only EVOH of the same obtained thickness.

Oxygen permeation rates across the entire thickness of the film, with the EVOH on the low humidity side, are calculated for the films of EXAMPLE 6 and COMPARATIVE EXAMPLE 6 and are shown graphically in FIG. 13. Curve "D" in FIG. 13 represents the films of EXAMPLE 6. Curve "E" represents the films of COMPARATIVE EXAMPLE 6. As seen therein, both films have excellent oxygen barrier of about 0.2-0.3 at low humidity. And while both curves do rise with increasing humidity, curve "D" rises much less than curve "E", indicating that the film of EXAMPLE 6 is much less sensitive to the increasing humidity. Namely, at 100% relative humidity, the film of EXAMPLE 6 has an OTR of only about 1.6, while that of COMPARATIVE EXAMPLE 6 is about 18.

The degree to which the objectives of the invention are met depends somewhat on the selection of the VDC and EVOH copolymers, on the thicknesses of the several layers and on the humidities to which the film is exposed. Thus the OTR of the layer of the EVOH selected should be less, at 0% R. H., preferably at 50%, than the OTR of the layer of the VDC copolymer selected. Representative OTR's for 1 mil thick films are seen in FIG. 11, both for EVOH, varying ethylene content, and for different VDC copolymers. By selecting a specific combination of EVOH and VDC copolymers, along with specifying appropriate corresponding layer thicknesses, wherein the OTR of the EVOH layer at lower humidity is less than the OTR of the selected VDC layer, improved OTR is obtained in the film over a similar film using the VDC at low humidity, and over a similar film using the EVOH at high humidity. The layer thicknesses actually obtained by extrusion are, of course, and as is conventionally known, only approximations of the thicknesses desired, the precision being limited to the precision capabilities of the film fabrication equipments used. The greater the difference between the OTR's, of the EVOH and VDC layers, and the greater the humidity range over which there is a deference, the greater the benefits of combining the EVOH and the VDC layers in the same film. So it is preferred to select a combination of EVOH and VDC copolymers, and layer thicknesses, where the OTR of the EVOH layer is less than the OTR of the VDC layer over a range of 0% R. H. to at least 25% R. H., preferably 0% R. H. to at least 50% R. H. Accordingly, for use with VDC-MA, the EVOH should generally have an ethylene content of less than about 40%, where EVOH and VDC layer thicknesses are equal. However, EVOH having 40%, or even 44% ethylene content, as seen in FIG. 11, can still benefit a film if combined with VDC-VC as the VDC layer, of if used in layer thicknesses greater than the thickness of the corresponding VDC layer, since the OTR is a function of not only polymer composition, but also layer thickness.

However, since the VDC copolymer controls the maximum OTR of the film, at high humidity, the EVOH can be selected without concern for the OTR at high humidity. Rather, more consideration is given to the OTR of the EVOH composition at low humidity, where the OTR of the EVOH is more controlling of the OTR of the film. Thus, preferred EVOH's are the lower ethylene content extrudable compositions, such as 28%-32% ethylene, which provide lower OTR's at low humidity. Thus, the superior oxygen barrier property of EVOH is typically controlling at lower humidity, while the higher, but less humidity-sensitive, oxygen barrier property of the VDC copolymer is controlling at higher humidity. Since the highest oxygen transmission rate of a film is generally controlled by the oxygen transmission rate of the VDC copolymer, it is usually advantageous to select a VDC copolymer having a relatively low oxygen transmission rate. Among the commercially available VDC copolymers, those having the methylacrylate comonomer are generally superior to those comprising the vinyl chloride comonomer, as seen in FIG. 11. Therefore the copolymer made with the methylacrylate as the comonomer is preferred in films and packages of the invention where oxygen transmission rate is a factor in selection the VDC copolymer.

Thus does the invention provide novel films and packages having excellent oxygen barrier and reduced sensitivity of the oxygen barrier to moisture, as well as methods of making the films. Those skilled in the art will now see that certain modifications can be made in the composition and structuring of the films and packages of the invention, and the methods of making them, with out departing from the spirit of the instant invention.

And while the invention has been described above the respect to its preferred embodiments, it will be understood that the invention is capable of numerous rearrangements, modifications and alterations and all such arrangements, modifications and alterations are intended to be within the scope of the appended claims.

Having thus described the invention, what is claimed is:

1. A multiple layer polymeric film comprising a first layer of ethylene vinyl alcohol copolymer, and second and third layers comprising vinylidene chloride copolymer and an adhesive polymer respectively, said second and third layers having been coextruded with said first layer, said third adhesive layer being bonded between said first and second layers and being bonded to both said first and second layers with a peel strength of at least 100 g./in. width, the incremental oxygen transmission rate of said first layer of ethylene vinyl alcohol at 0% relative humidity being less than the incremental oxygen transmission rate of said second layer of vinylidene chloride copolymer at 0% relative humidity.

2. A multiple layer polymeric film as in claim 1, the incremental oxygen transmission rate of said first layer of ethylene vinyl alcohol copolymer at 50% relative humidity being less than the incremental oxygen transmission rate of said second layer of vinyldiene chloride copolymer at 50% relative humidity.

3. A multiple layer polymeric film as in claim 1 or 2 wherein said vinylidene chloride copolymer is vinylidene chloride vinyl chloride copolymer.

4. A multiple layer polymeric film as in claim 1 or 2 wherein said vinylidene chloride copolymer is vinylidene chloride methylacrylate copolymer.

5. A multiple layer polymeric film, said polymeric film comprising a first extruded layer of ethylene vinyl alcohol copolymer and a second layer of a vinylidene chloride copolymer coextruded with said first extruded layer of ethylene vinyl alcohol copolymer, the ratio of the incremental water vapor transmission rate between said first layer of ethylene vinyl alcohol copolymer and the outer surface of said film through said vinylidene chloride copolymer layer to the water vapor transmission rate between said first layer and the other surface of said film being no more than about 0.25/1.

6. A multiple layer polymeric film, said polymeric film comprising a first extruded layer of ethylene vinyl alcohol copolymer, a second layer of vinylidene chloride copolymer, and a third layer of an adhesive polymer, said second and third layers both having been coextruded with said third adhesive layer of ethylene vinyl alcohol copolymer, said third adhesive layer being bonded to both of said first and second layers with a peel strength of at least about 100 g/in. width, the ratio of the incremental water vapor transmission rates between said first layer of ethylene vinyl alcohol copolymer and the outer surface of said film through said vinylidene chloride copolymer layer to the water vapor transmission rate between said first layer and the other surface of said film being no more than about 0.25/1.

7. A multiple layer film as in claim 1, the ratio of the incremental water vapor transmission rates between said first layer of ethylene vinyl alcohol copolymer and the outer surface of said film through said vinylidene chloride copolymer layer to the water vapor transmission rate between said first layer and the other surface of said film being no more than about 0.25/1.

8. A multiple layer film as in claim 2, the ratio of the incremental water vapor transmission rates between said first layer of ethylene vinyl alcohol copolymer and the outer surface of said film through said vinylidene chloride copolymer layer to the water vapor transmission rate between said first layer and the other surface of said film being no more than about 0.25/1.

9. A multiple layer film as in claim 3, the ratio of the incremental water vapor transmission rates between said first layer of ethylene vinyl alcohol copolymer and the outer surface of said film through said vinylidene chloride copolymer layer to the water vapor transmission rate between said first layer and the other surface of said film being no more than about 0.25/1.

10. A multiple layer film as in claim 4, the ratio of the incremental water vapor transmission rates between said first layer of ethylene vinyl alcohol copolymer and the outer surface of said film through said vinylidene chloride copolymer layer to the water vapor transmission rate between said first layer and the other surface of said film being no more than about 0.25/1.

11. A package made with a film of claim 3,

12. A package made with a film of claim 4.

13. A film made with a method of:
(a) selecting first and second compositions of ethylene vinyl alcohol copolymer and vinylidene chloride copolymer respectively, and respective first and second thicknesses for respective first and second layers to be made from said first and second compositions, such that the incremental oxygen transmission rate of said first layer of ethylene vinyl alcohol copolymer at 0% relative humidity is less than the incremental oxygen transmission rate of said second layer of vinylidene chloride copolymer at 0% relative humidity; and
(b) fabricating a film having said first and second layers of approximately said first and second thicknesses, and made from said first and second compositions.

14. A film as in claim 13 wherein said fabricating of said film comprises coextruding said first and second layers of ethylene vinyl alcohol copolymer and vinylidene chloride copolymer.

15. A film as in claim 13 and including, in said method, the steps of selecting, as an adhesive, an extrudable composition, from the group consisting of ethylene vinyl acetate copolymer containing greater than 15% vinyl acetate, blends and copolymers of polypropylene and ethylene vinyl acetate copolymer, ethylene methylacrylate copolymer, anhydride modified polypropylene and anhydride modified ethylene vinyl acetate copolymer, and coextruding said selected extrudable adhesive with said first and second layers, as a third layer, between said first and second layers.

16. A film as in claim 13, 14, or 15, and wherein the layers are arranged such that the ratio of the incremental water vapor transmission rate between said first layer of ethylene vinyl alcohol copolymer and one outer surface of said film through said vinylidene chloride copolymer layer to the water vapor transmission rate between said first layer and the other surface of said film is no more than 0.25/1.

17. A multiple layer polymeric film, comprising:
(a) a first layer comprising an ethylene vinyl alcohol copolymer;
(b) a second layer comprising a vinylidene chloride copolymer; and
(c) a third adhesive layer between said first and second layers, in surface-to-surface contact with, and providing adhesion to, at least one of said first and second layers, said adhesion comprising at least 100 grams, per inch width, peel strength, the ratio of the incremental water vapor transmission rate between said first layer of ethylene vinyl alcohol copolymer and the outer surface of said film through said second vinylidene chloride copolymer layer to the water vapor transmission rate between said first layer and the other surface of said film being no more than about 0.25/1.

18. A package made with a film produced according to the method comprising:
   (a) producing a first melt stream comprising ethylene vinyl alcohol copolymer;
   (b) producing a second melt stream comprising a vinylidene chloride copolymer;
   (c) producing a third melt stream of a polymeric composition, said polymeric composition being adapted to bonding in the melt state, directly to a surface of at least one of said first and second compositions to provide, in the solid state, an interfacial peel strength of at least 100 grams per inch width;
   (d) feeding said first, second, and third melt streams into a coextrusion die;
   (e) combining said first, second, and third melt streams, with said third melt stream between said first and second melt streams;
   (f) fabricating said combined melt streams into a multiple layer film in said die, said film comprising a first layer comprising said ethylene vinyl alcohol copolymer, and a second layer comprising said vinylidene chloride copolymer, and a third layer, disposed between said first and second layers and comprising said polymeric composition of said third melt stream; and extruding said multiple layer film out of said die; and
   (g) cooling said coextruded film,
wherein said vinylidene chloride copolymer is a vinylidene chloride vinyl chloride copolymer.

19. A package made with a film produced according to the method comprising:
   (a) producing a first melt stream comprising ethylene vinyl alcohol copolymer;
   (b) producing a second melt stream comprising a vinylidene chloride copolymer;
   (c) producing a third melt stream of a polymeric composition, said polymeric composition being adapted to bonding in the melt state, directly to a surface of at least one of said first and second compositions to provide, in the solid state, an interfacial peel strength of at least 100 grams per inch width;
   (d) feeding said first, second, and third melt streams into a coextrusion die;
   (e) combining said first, second, and third melt streams, with said third melt stream between said first and second melt streams;
   (f) fabricating said combined melt streams into a multiple layer film in said die, said film comprising a first layer comprising said ethylene vinyl alcohol copolymer, a second layer comprising said vinylidene chloride copolymer, and a third layer, disposed between said first and second layers and comprising said polymeric composition of said third melt stream; and extruding said multiple layer film out of said die; and
   (g) cooling said coextruded film,
wherein said vinylidene chloride copolymer is a vinylidene chloride methylacrylate copolymer.

20. A multiple layer film, comprising:
   (a) a first layer comprising an ethylene vinyl alcohol copolymer;
   (b) a second layer comprising a vinylidene chloride copolymer; and
   (c) a third adhesive layer between said first and second layers, in surface-to-surface contact with, and providing adhesive to, at least one of said first and second layers, said adhesion being at least 100 grams per inch width, peel strength, the composition of said third adhesive layer being selected from the group consisting of ethylene vinyl acetate copolymer having greater than 15% vinyl acetate, blends and copolymers of polypropylene and ethylene vinyl acetate copolymer, anhydride modified polypropylene, and anhydride modified ethylene vinyl acetate copolymer.

21. A multiple layer film, comprising:
   (a) a first layer comprising an ethylene vinyl alcohol copolymer;
   (b) a second layer comprising a vinylidene chloride copolymer;
   (c) a third adhesive layer between said first and second layers, said third adhesive layer being in surface-to-surface adhesive bonding contact with both of said first and second layers, said adhesion being at least 100 grams per inch width, peel strength.

22. A film as in claim 14 and including, in said method, the steps of selecting, as an adhesive, an extrudable composition from the group consisting of ethylene vinyl acetate copolymer containing greater than 15% vinyl acetate, blends and copolymers of polypropylene and ethylene vinyl acetate copolymer, ethylene methylacrylate copolymer, anhydride modified polypropylene and anhydride modified ethylene vinyl acetate copolymer, and coextruding said selected extrudable adhesive with said first and second layers, as a third layer, between said first and second layers.

23. A package made with a film of claim 12.

24. A package made with a film of any one of claims 1, 2, 5, 6, 7, 8, 13, 14, 15, 17, 20, 21, or 22.

25. A package as in claim 24, said package comprising a package interior, said vinylidene chloride copolymer layer being disposed between said ethylene vinyl alcohol copolymer layer and the interior of said package.

26. A package as in claim 23, said package comprising a package interior, said vinylidene chloride copolymer layer being disposed between said ethylene vinyl alcohol copolymer layer and the interior of said package.

27. A package as in any one of claims 18-20, said package comprising a package interior, said vinylidene chloride copolymer layer being disposed between said ethylene vinyl alcohol copolymer layer and the interior of said package.

28. A package as in claim 24, said package comprising a package exterior, said vinylidene chloride copolymer layer being disposed between said ethylene vinyl alcohol copolymer layer and the exterior of said package.

29. A package as in claim 23, said package comprising a package exterior, said vinylidene chloride copolymer layer being disposed between said ethylene vinyl alcohol copolymer layer and the exterior of said package.

30. A package as in any of claims 18-20, said package comprising a package exterior, said vinylidene chloride copolymer layer being disposed between said ethylene vinyl alcohol copolymer layer and the exterior of said package.

* * * * *